May 10, 1927.

G. CONSTANTINESCO

MEANS FOR ADVANCING AND RETARDING A DRIVEN
SHAFT RELATIVELY TO A DRIVING SHAFT

Filed March 28, 1925  2 Sheets-Sheet 1

1,627,632

Inventor
G. Constantinesco
by [signature]
Atty.

May 10, 1927.

G. CONSTANTINESCO 1,627,632

MEANS FOR ADVANCING AND RETARDING A DRIVEN
SHAFT RELATIVELY TO A DRIVING SHAFT

Filed March 28, 1925    2 Sheets-Sheet 2

Inventor-
G. Constantinesco
By ...
Atty

Patented May 10, 1927.

1,627,632

UNITED STATES PATENT OFFICE.

GEORGE CONSTANTINESCO, OF WEYBRIDGE, ENGLAND.

MEANS FOR ADVANCING AND RETARDING A DRIVEN SHAFT RELATIVELY TO A DRIVING SHAFT.

Application filed March 28, 1925, Serial No. 19,116, and in Great Britain April 10, 1924.

The present invention relates to means for advancing or retarding the movement of a driven shaft, relatively to a driving shaft and is especially applicable to advancing or retarding an instrument such as the magneto of an internal combustion engine in order to regulate the ignition, or for advancing and retarding the driving angles of cams operating synchronizing gears controlling the fire of machine guns on aeroplanes so as to ensure that it shall take place at definite intervals in accordance with the revolutions of the propeller so that the bullets pass between the blades.

The invention is also applicable to many other purposes. For instance to the operation of fuel injectors, to actuating valves for internal combustion engines and other such purposes where advancing or retarding is required between two shafts when the speed of rotation increases or decreases.

The invention consists in automatically retarding the position of a driven member relatively to a driving member by so arranging a spring operated catch which effects the drive that on increase of speed of the driving member, the catch moves outwardly owing to centrifugal force and is disengaged from the driven member, thus allowing the driving member to overrun until a second catch thereon engages with the co-operating catch on the driven member. This disengagement depends only on the speed and is independent of the power transmitted.

The invention also consists in clutch mechanism in which relative movement between a driven shaft and a driving shaft is automatically obtained, comprising a driving arm or arms pivoted on the driving member and having two driving catches, a spring being provided acting on the driving arm in the direction to cause engagement of one of the said catches with a single catch on the driven member, the arm or arms being so arranged that when the speed of the driving shaft reaches a certain value, the centrifugal force of the driving arm causes a movement against the action of the spring in such a direction that one of the catches is released allowing the driving member to overrun the driven member until the second catch on the driving arm engages with the catch on the driven member.

The invention further consists in providing on the driving member a number of such driving arms or catches so arranged that each driving arm holds the succeeding driving arm out of operation, whereby a number of different positions of the driving shaft relatively to the driven shaft may be obtained automatically according to the speed of rotation.

The invention also consists in a clutch providing automatically advance and retardation by successive steps comprising a driving member, two or more driving arms pivoted on such driving member, the first driving arm having a catch adapted to engage a single catch or key on the driven member and a second catch adapted to engage the second driving arm so as to keep the driving catch on such second arm out of operation, such second arm having a catch engaging with a third arm and adapted to keep such third arm out of operation, the three arms being each actuated by springs tending to bring their catches into operation, the springs being of graduated strength so that the catches on the successive arms come into operation to effect the drive successively as the speed of the driving shaft increases.

The invention further consists in arranging on the third or on the last driving arm in such arrangement a second catch which gives a fourth or a final driving position.

Referring to the accompanying drawings:—

Fig. 4 is a diagrammatic view, illustrative of the action of the apparatus when applied to firing through an aeroplane propeller.

Figure 1:
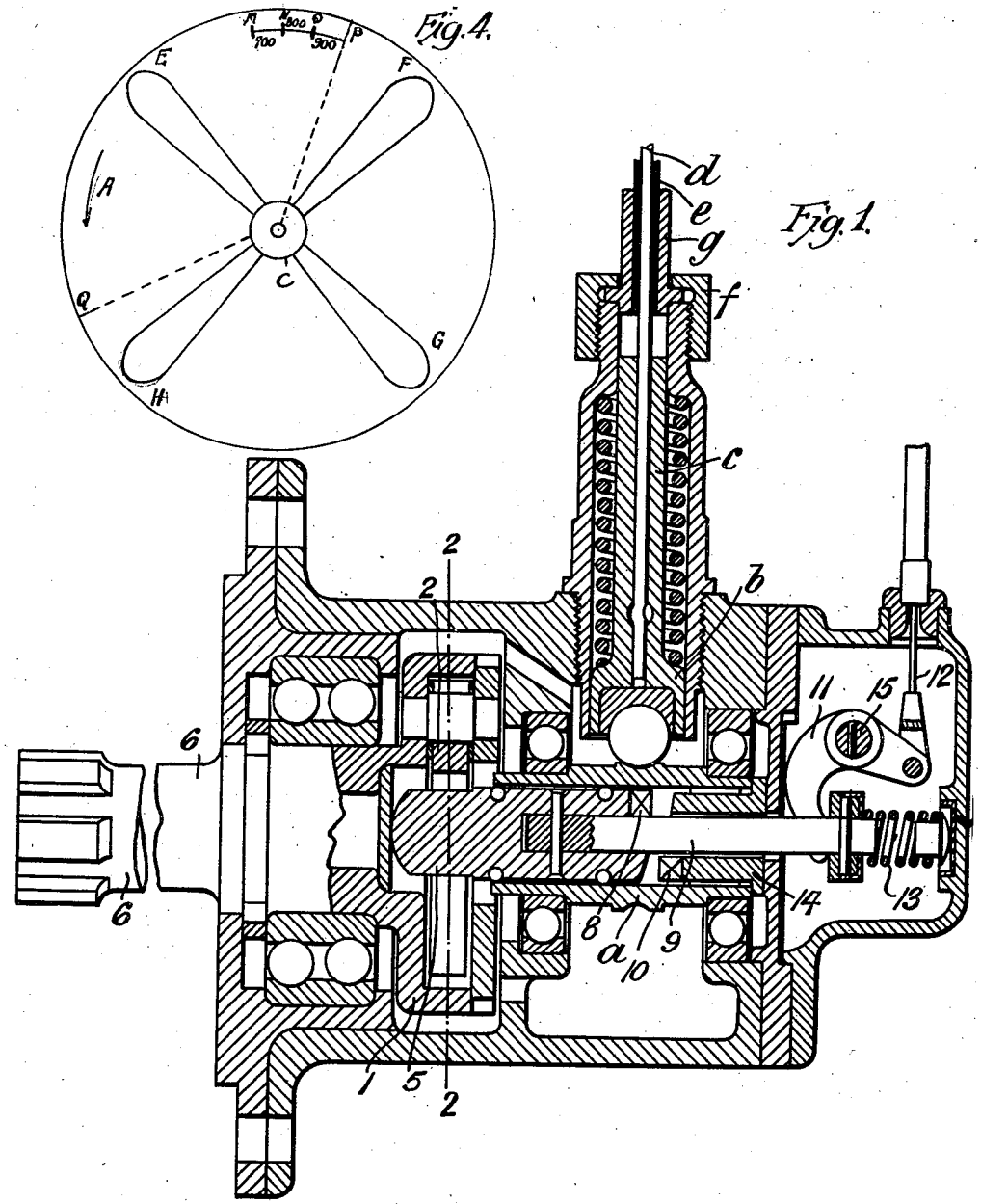
Figure 1 is a longitudinal section through a synchronizing apparatus according to the invention.
Figure 2:
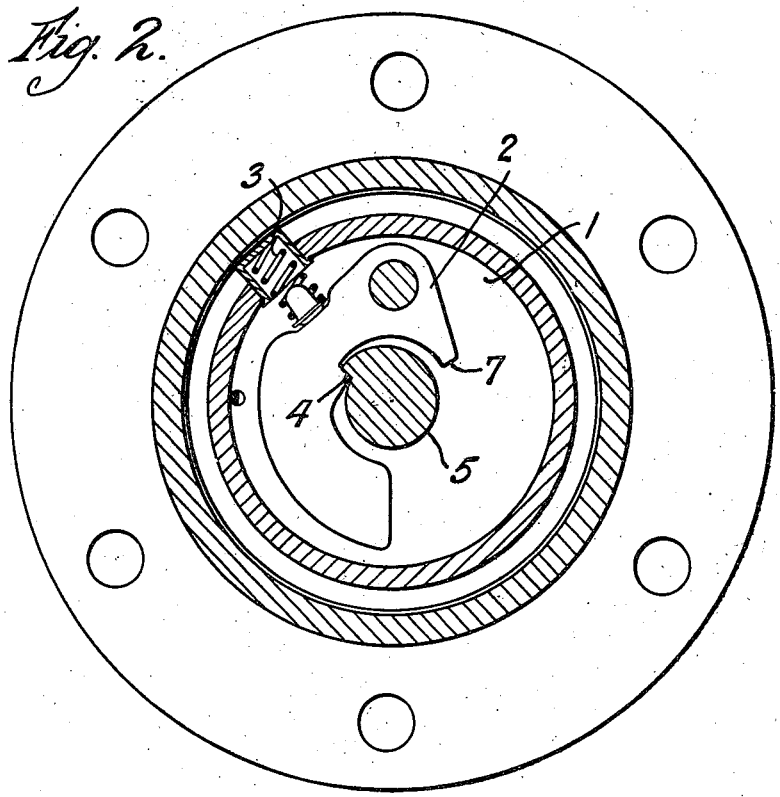
Figure 2 is a section on the line 2—2, Figure 1.

Figures 1 and 2 show an arrangement in which only two relative positions of the driving and driven shafts are required. A disk 1 moving with the driving shaft 6 has pivoted thereon an arm 2 moved by a spring 3 in such a direction that a hook 4 formed on the arm is caused to engage with a key or projection on a driven shaft 5. The arm 2 is so arranged that as the speed of the driving shaft increases it tends to fly outwards against the action of the spring 3 so that the hook moves to a position clear of the projection on the driven shaft. On the arm 2 there is provided also an abutment 7 in advance of the hook 4 and when the arm is in its outer position, this abutment comes against the driven shaft and after a certain angle of revolution engages with the projection on the driven shaft, so that the drive then takes place between the abutment 7 and the projection. In this way the position of the driving shaft is, relatively to the driven shaft, advanced by the angular distance between the hook 4 which first engaged the projection on the driven shaft and the abutment 7. This effect is produced by the fact that the shaft 5 remains behind by an angle of 360 degrees less the angle between the hook 4 and the abutment 7. Actually this is a lag, but as phase relations only need be considered, it amounts to an advance between the hook and the abutment.

Figure 3:
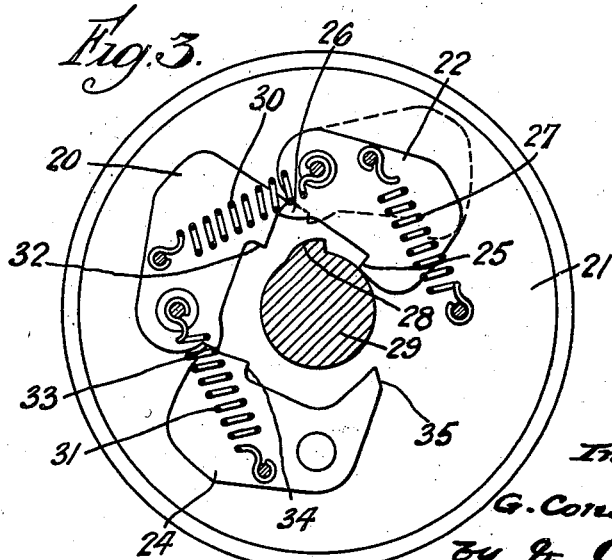
Figure 3 shows a modified arrangement by which compensation for increased speed can be obtained.

According to another modification of the invention shown in Figure 3, in which a number of different relative positions are required, three driving arms 22, 20 and 24 are provided on the disk attached to the driving shaft. The first 22 of these carries a hook 25 and abutment 26, as in the modification above described, and is held by a spring 27 so that the hook 25 tends to engage with the projection or key 28 on the driven shaft. The second arm 20 is held by a stronger spring 30 and the third driving arm by a still stronger spring 31. The second driving arm 20 is provided with a driving hook 32 and abutment 33 and the third driving arm 24 with two driving catches 34 and 35. The abutment 26 on the first driving arm 22, when the latter is driving, serves to keep the driving hook 32 on the second driving arm 20 out of engagement with the projection 28 on the driven shaft and the abutment 33 on the second driving arm 20, when the latter is held by the first, or is in the driving position, keeps the driving hook 34 on the third driving arm 24 out of engagement with the projection 28 on the driven shaft 29. The second driving hook 35 on the third driving arm 24 only comes into operation when the centrifugal force is sufficient to overcome the tension in the strongest spring.

By this arrangement four different positions of driving may be obtained automatically giving four positions in which the driving shaft is more or less advanced or retarded relatively to the driven shaft.

The operation of the device will be clear from Figure 4 when it is remembered that the speed of the propeller is variable, while the time taken by the bullet to travel between the breach of the gun and the propeller is always the same. E, F, G, H, are the propeller blades, and C is the center of the propeller. To make the explanation clearer, suppose a continuous disk represented by the circle to be carried by the propeller. The arrow A shows the direction of rotation. On account of the change of propeller speed above referred to, bullets fired when the speed is, say, 300 R. P. M. so as just to clear the rear edge of the blade E will be spread over the area of the disk between E and F as the speed rises. For instance, the marks of bullets fired when the speed is 600 to 700 R. P. M. will be found within an area M C N, for a speed of 700 to 800 within an area N C O, and for 800 to 900 O C P. It would be unsafe to go on firing through the area between the blades E and F for a higher propeller speed lest the leading edge of the blade F should be struck, and consequently a change of phase is made as above described, the result of which change is that the bullets strike the disk along or near a line C Q slightly behind the rear edge of the blade H, which has by this time arrived at or near the position occupied by F in the drawing. The area available for spread of the bullets with rising speed is now the area between the line C Q and the leading edge of the blade E. If this edge is approached dangerously another change of phase is required, and so on, but in practice a single change is generally found sufficient. Of course, converse effects take place with a diminishing propeller speed.

In order to disconnect the driven shaft from the driving shaft completely when required, the means shown in Fig. 1 may be provided. A rod 9 is secured in an axial hole in the driven shaft and can be moved axially by a lever 11 in opposition to a spring 13. The lever is pivoted at 15 and is actuated by a control which may be a wire 12. When the rod 9 is moved to the right by the lever, a lug 8 on the driven shaft 5 engages a lug 10 on a sleeve 14 which is keyed to a cam $a$ from which power may be taken. In the case illustrated, the cam communicates motion to a wire $d$ as described in my specification Serial No. 73,894. When the device is applied to firing through an aeroplane propeller, the driving shaft 6 rotates with the propeller.

As an alternative to the above disconnecting device, the driven shaft may be given an axial movement so that the projection or key which it carries is out of the plane in which the driving arms or catches are situated.

By such an arrangement accurate timing of the shots fired from a machine gun mounted on an aeroplane can be obtained at varying speeds of the propeller. It will be seen that when the propeller is rotating at a high speed, the wire $d$ actuates the gun trigger and the instant at which the cam strikes the blow upon it is automatically advanced when the propeller speed increases, the amount of advance being wholly independent of the force of the blow.

What I claim is:—

1. Means for changing the phase relation of a driving and a driven shaft irrespective of the power transmitted when the speed of the driving shaft reaches certain values, comprising centrifugally operated pawl mechanism carried by the driving shaft, two or more driving portions on the said pawl mechanism, and means on the driven shaft for engaging said driving portions which are adapted to come successively into operation on the said engaging means by centrifugal action when the speed of the driving shaft reaches certain predetermined values.

2. Means for changing the phase relation of a driving and a driven shaft irrespective of the power transmitted when the speed of the driving shaft reaches certain values, comprising a centrifugally operated pawl carried by the driving shaft, two teeth on said pawl, and a lug on the driven shaft adapted to engage with said teeth which are adapted to come alternatively into operation on the said engaging means by centrifugal action when the speed of the driving shaft reaches certain predetermined values.

In testimony that I claim the foregoing as my invention I have signed my name this 12th day of March 1925.

GEORGE CONSTANTINESCO.